Dec. 30, 1941. G. E. BARNHART 2,268,469
THERMAL ENERGY RESPONSIVE INDICATING DEVICE
Filed Feb. 12, 1940
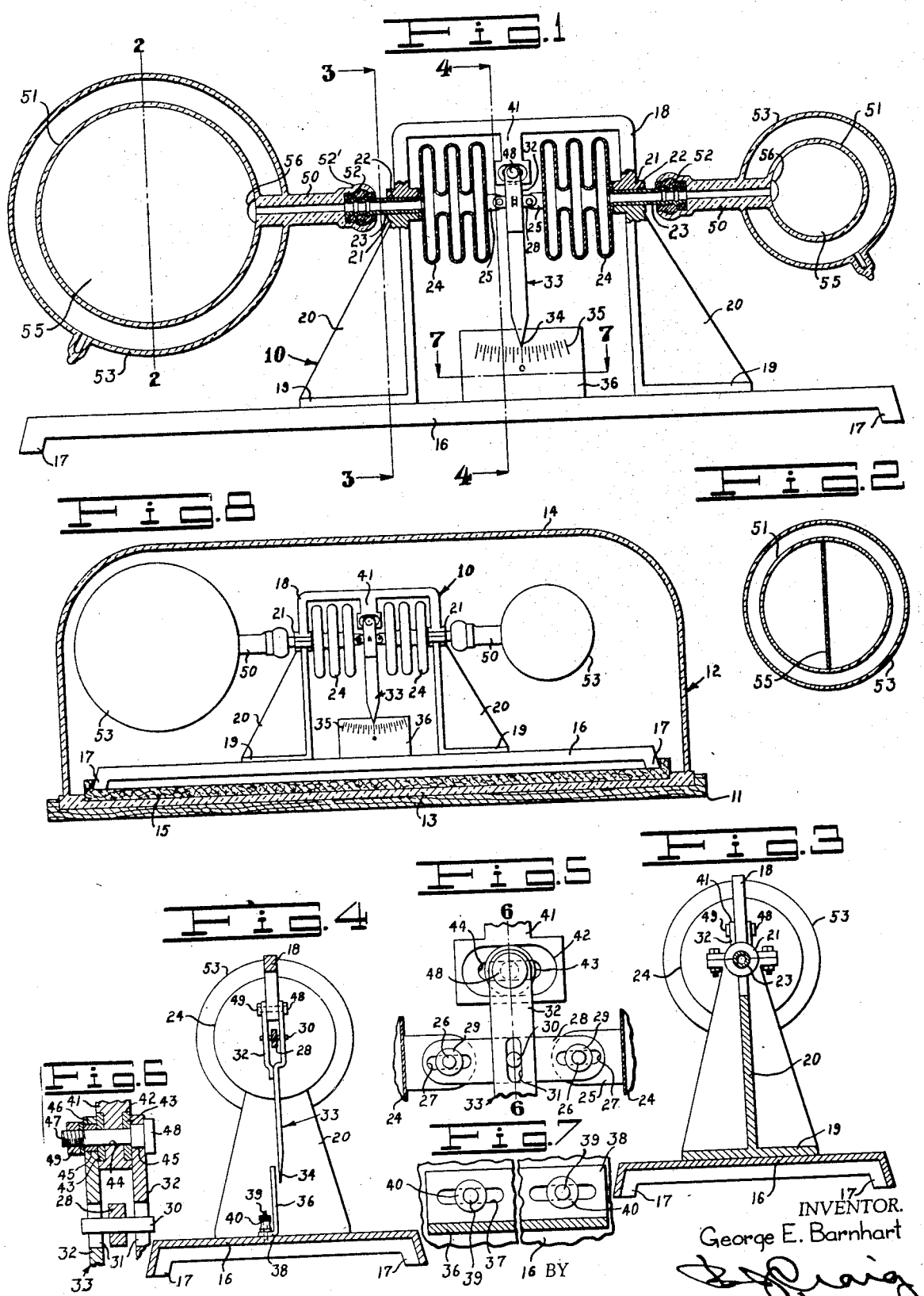
INVENTOR.
George E. Barnhart Patented Dec. 30, 1941

2,268,469

UNITED STATES PATENT OFFICE 2,268,469

THERMAL ENERGY RESPONSIVE INDICATING DEVICE

George E. Barnhart, Pasadena, Calif.

Application February 12, 1940, Serial No. 318,456

4 Claims. (Cl. 73—151)

This invention relates to indicating instruments.

The general object of the invention is to provide a novel indicating instrument which is subject to radiation.

A more specific object of the invention is to provide an indicating apparatus which is sensitive to luminous radiation.

An additional object of my invention is to provide a novel indicating instrument involving a pair of hollow expansion members which may be of unequal volume and wherein the contained gas may be of different pressures in the respective members and wherein the movement of an indicator is subject to the combined effect of the two members.

Another object of my invention is to provide an indicator including operating expansion and contraction members so constructed that they are not subject to atmospheric or barometric changes.

Another object of the invention is to provide an indicating device which is sensitive to heat radiation.

A further object of the invention is to provide a novel indicating device which is operated by an expansion and contraction member.

Another object of the invention is to provide a novel pointer adjusting arrangement for an indicating device.

Another object of the invention is to provide an instrument including expansible and contractable members, whose movement is effected by forces supplied by members connected thereto.

Other objects and the advantages of this invention will be apparent from the following description taken in connection with the accompanying drawing, wherein:

Fig. 1 is a side elevation, partly in section, showing an apparatus embodying the features of my invention;

Figs. 2, 3 and 4 are sections taken on lines 2—2, 3—3, and 4—4, respectively, Fig. 1;

Fig. 5 is a fragmentary enlarged sectional detail;

Fig. 6 is a section taken on line 6—6, Fig. 5;

Fig. 7 is a section taken on line 7—7, Fig. 1; and

Fig. 8 is a central sectional view through a casing showing my invention in elevation therein.

Referring to the drawing by reference characters the invention is shown as embodied in an instrument which is indicated generally at 10. As shown the instrument includes a base 11 on which a casing 12 is mounted. This casing is shown as including a bottom 13 and a transparent top portion 14 hermetically sealed to the bottom.

The bottom 13 includes a recess which receives a cushion member 15 on which a base 16 having a peripheral flange 17 is mounted.

Mounted on the base 16 I show an inverted U-shaped support 18 which is provided with feet 19 and stiffening ribs 20.

The support includes opposed bosses 21 which are aligned and are provided with aligned apertures 22.

Mounted in each of the apertures I show an inlet tube 23 of a bellows member 24. The bellows members are each preferably of the same capacity.

As shown each bellows includes an ear 25 which supports a pin 26 fitted in a slot 27 in a member 28 which connects the bellows. Each pin 26 is threaded to receive a thumb nut 29, and the construction is such that when the thumb nuts are tightened the bellows are connected by the member 28 to move in unison, and when one of the thumb nuts is loosened the connecting member 28 will be moved by its engagement with the other bellows.

The connecting member 28 includes a pin 30 which projects from both sides thereof and is received in slots 31 mounted in the upper portion 32 of a pointer member indicated generally at 33. The pointer 33 includes an arrow 34 movable over a scale 35 on a scale member 36 which includes adjusting slots 37 in a flange 38 thereon. The slots 37 receive bolts 39 which pass through the base 16 and are held in place by thumb nuts 40 so that the position of the scale can be adjusted.

The support 18 includes an arm 41 enlarged at its lower end and recessed at 42. In each recess I arrange a plate 43. The plates 43 as well as the arm are provided with aligned slots 44. The portion 32 of the pointer includes aligned apertures 45 with a collar 46 disposed in one of the apertures and with a fastening member 47 passing through the pointer and through the slots 44 in the arm 41 and in the plates 43.

The fastening member 47 at one end includes a head 48 and at the other end a thumb nut 49 and the construction is such that by loosening the thumb nut 49 the position of the upper end of the pointer on the arm 41 can be adjusted.

Mounted on each of the inlet tubes 23 I show a tube 50 of a bulb member 51 which affords communication between each bellows and its associated bulb. A suitable sealing means 52 insures a tight joint. This sealing means 52 is arranged in an enlarged portion 52' on the tube 50.

Each of the bulbs 51 as shown includes an insulating jacket 53 with the space between the bulb and jacket preferably exhausted. The bulbs 51 are preferably of different volumes and as shown each bulb contains a heat absorbing disk 55 notched at 56 to permit gas flow from the bulb to its associated tube. The bulbs when of different volumes and with a heat absorbing disk in each bulb, provide a differential effect, thereby increasing the sensitivity and accuracy of the device.

The disk 55 may be black or of any color depending on the intended use of the instrument and the bulbs may be filled with gas such as nitrogen which communicates with the interior of the bellows.

The device may be used as shown in Fig. 1 or in certain instances it may be placed in a casing as shown in Fig. 8.

In use the needle member 33 is adjusted so that it hangs in a vertical position and the scale 35 is adjusted so that the zero thereon is in line with the end of the pointer.

The bulbs are then subjected to the type of radiation the effect of which is to be determined and a reading is taken. The scale may be suitably calibrated with a known standard or the reading may be made with two or more intensities of radiation, one of which is of standard character so that the effect produced on the instrument can be determined.

It will be apparent that one of the bulbs 51 may be omitted in certain types, and that for certain purposes one or both of the heat insulating jackets may be omitted. It will also be understood that the term "bellows" used herein may be construed as referring to hollow multiple diaphragms, Bourdon tubes and other expansion and contraction members and that suitable means for controlling the volume of the expansible members during the manufacture of the instrument may be employed.

In certain instances the disks 55 may be entirely omitted and in other instances the color of the disks may be varied and that the disclosure is by way of illustration only and that various changes can be made within the terms of the claims.

Having thus described my invention, I claim:

1. In an instrument of the class described, a base, a support on said base, a pair of expansion and contraction members mounted on said support, each of said members including an inlet tube at one end, means connecting the inner ends of said expansion and contraction members, a bulb connected to each of said expansion and contraction inlets, a heat insulating member surrounding each of said bulbs, each of said bulbs having a heat absorbing plate therein, the plates in the two bulbs being substantially coplanar, a pointer, and means operated by said connecting means for shifting the pointer.

2. In an instrument of the class described, a base, an inverted U-shaped support on said base, said support including aligned apertures, a pair of expansion and contraction members, each of said members including an inlet tube arranged in one of said apertures and projecting outwardly beyond the end thereof, means connecting the inner ends of said expansion and contraction members, an indicator, means operated by said connecting means for shifting the indicator, a pair of bulb tubes each mounted on one of said member tubes, said bulb tubes being aligned with said member tubes, a bulb mounted on each of said bulb tubes, a vertically disposed heat absorbing plate within each of said bulbs, the plates in the two bulbs being coplanar and having notches to permit gas to flow from both sides of the plate in each bulb to its associated tube, one of said plates being of greater area than the area of the other plate.

3. In an instrument of the class described, a base, an inverted U-shaped support on said base, said support including aligned opposed apertured bosses, a pair of expansion and contraction members, each of said members including an inlet tube arranged in one of said apertures and projecting outwardly beyond the end thereof, means connecting the inner ends of said expansion and contraction members, an indicator, means operated by said connecting means for shifting the indicator, a pair of bulb tubes each having an enlarged end recess with a gasket therein, one of said gaskets being fitted on one of said member tubes, the other gasket being fitted on the other member tube, said bulb tubes being aligned with said member tubes, a bulb mounted on each of said bulb tubes, a vertically disposed heat absorbing plate within each of said bulbs, said plates each having an area substantially equal to that of the cross sectional area of the interior of the associated bulb through its center, the plates in the two bulbs being coplanar and intersecting the axis of all of said tubes, each of said plates being notched adjacent the bulb tube to permit gas to flow from both sides of the plate in each bulb to its associated tube.

4. In an instrument of the class described, a base, an inverted U-shaped support on said base, strengthening ribs connecting said base and the sides of said support, said support including alined opposed apertured bosses, a pair of expansion and contraction members, each of said members including an inlet tube arranged in one of said apertures and projecting outwardly beyond the end thereof, means connecting the inner ends of said expansion and contraction members, an indicator, means operated by said connecting means for shifting the indicator, a pair of bulb tubes each having an enlarged end recess with a gasket therein, one of said gaskets being fitted on one of said member tubes, the other gasket being fitted on the other member tube, said bulb tubes being axially aligned with said member tubes, a substantially spherical bulb mounted on each of said bulb tubes, a vertically disposed heat absorbing plate within each of said bulbs, said plates each having a diameter substantially equal to that of the interior of the associated bulb, the plates in the two bulbs being coplanar and intersecting the axis of all of said tubes, each of said plates being notched adjacent the bulb tube to permit gas to flow from both sides of the plate in each bulb to its associated tube, one of said bulbs and its associated plate being of greater diameter than the other bulb and its associated plate.

GEORGE E. BARNHART.